(12) United States Patent
Luo et al.

(10) Patent No.: US 12,197,251 B2
(45) Date of Patent: Jan. 14, 2025

(54) FLEXIBLE SUPPORT LAYER AND FLEXIBLE DISPLAY DEVICE

(71) Applicant: BOE Technology Group Co., Ltd., Beijing (CN)

(72) Inventors: Xiaofei Luo, Beijing (CN); Shangchieh Chu, Beijing (CN); Yanyan Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/912,861

(22) PCT Filed: Nov. 19, 2021

(86) PCT No.: PCT/CN2021/131594
§ 371 (c)(1),
(2) Date: Sep. 20, 2022

(87) PCT Pub. No.: WO2022/199073
PCT Pub. Date: Sep. 29, 2022

(65) Prior Publication Data
US 2024/0210994 A1    Jun. 27, 2024

(30) Foreign Application Priority Data
Mar. 25, 2021    (CN) .......................... 202110322347.8

(51) Int. Cl.
*G06F 1/16*    (2006.01)
(52) U.S. Cl.
CPC .......... *G06F 1/1652* (2013.01); *G06F 1/1656* (2013.01)

(58) Field of Classification Search
CPC .... G06F 1/1652; G06F 1/1656; G06F 1/1616; G06F 1/1641; G09F 9/301; H04M 1/0206; H04M 1/0268
See application file for complete search history.

(56) References Cited

U.S. PATENT DOCUMENTS 10,551,880 B1 * 2/2020 Ai .......................... G06F 1/1641
11,204,627 B2 * 12/2021 Park .................... H04M 1/0268
(Continued)

FOREIGN PATENT DOCUMENTS

CN    109830185 A  * 5/2019 ............. G09F 9/301
CN    209461082 U    10/2019
(Continued)

OTHER PUBLICATIONS

International Search Report for PCT/CN2021/131594 Mailed Feb. 17, 2022.
(Continued)

*Primary Examiner* — Rockshana D Chowdhury
*Assistant Examiner* — Martin Antonio Asmat Uceda
(74) *Attorney, Agent, or Firm* — Ling Wu; Stephen Yang; Ling and Yang Intellectual Property

(57) ABSTRACT

A flexible support layer and a flexible display device are provided, and the flexible support layer includes at least two non-bending regions and at least one bending region connecting two adjacent non-bending regions, wherein a bending region includes a fixed region and a pattern region located between the fixed region and a non-bending region, a support strip is provided at one side of the pattern region.

11 Claims, 5 Drawing Sheets

(56) References Cited

U.S. PATENT DOCUMENTS

| | | | |
|---|---|---|---|
| 11,886,255 B2* | 1/2024 | Lee | G06F 1/1641 |
| 2015/0016126 A1* | 1/2015 | Hirakata | F21V 15/012 |
| | | | 362/418 |
| 2017/0263492 A1 | 9/2017 | Son et al. | |
| 2018/0102496 A1 | 4/2018 | Kim et al. | |
| 2020/0218311 A1* | 7/2020 | Park | H04M 1/0214 |
| 2021/0111357 A1 | 4/2021 | Kawaguchi et al. | |
| 2022/0124925 A1 | 4/2022 | Xie et al. | |
| 2022/0171440 A1* | 6/2022 | Lee | G06F 1/1637 |
| 2022/0287189 A1* | 9/2022 | Kim | G06F 1/1652 |
| 2023/0087236 A1* | 3/2023 | Han | G06F 1/1681 |
| | | | 345/173 |

FOREIGN PATENT DOCUMENTS

| | | |
|---|---|---|
| CN | 110649058 A | 1/2020 |
| CN | 110689811 A | 1/2020 |
| CN | 111182102 A | 5/2020 |
| CN | 111583803 A | 8/2020 |
| CN | 111816070 A | 10/2020 |
| CN | 111986571 A | 11/2020 |
| CN | 113066373 A | 7/2021 |
| KR | 10-2018-0040766 A | 4/2018 |
| WO | 2018179214 A1 | 10/2018 |

OTHER PUBLICATIONS

Office Action dated Aug. 31, 2022 for Chinese Patent Application No. 202110322347.8 and English Translation.

* cited by examiner

FLEXIBLE SUPPORT LAYER AND FLEXIBLE DISPLAY DEVICE

CROSS-REFERENCE TO RELATED APPLICATIONS

The present application is a U.S. National Phase Entry of International Application PCT/CN2021/131594 having an international filing date of Nov. 19, 2021, which claims priority of Chinese patent application No. 202110322347.8, filed to the CNIPA on Mar. 25, 2021 and entitled "Flexible Support Layer and Flexible Display Device", and the contents disclosed in the above-mentioned applications are hereby incorporated as a part of this application.

TECHNICAL FIELD

Embodiments of the present disclosure relate to, but are not limited to, the field of display technologies, and more particularly to a flexible support layer and flexible display device.

BACKGROUND

With the continuous development of display technology, foldable display terminals have become a development trend of electronic products. When a foldable display terminal is in a folded state, its area can be reduced, which is convenient for users to carry, and when it is unfolded, it has a larger display area and a better display effect.

At present, folding of a developed flexible display device is implemented by a rotating shaft, and a flexible support layer between a flexible display module and the rotating shaft is very important in the flexible display device, which not only ensures flatness of the flexible display module when it is folded or unfolded, but also meets stretchability of a bending form of the flexible display module.

The flexible support layer includes a non-bending region and a bending region, the bending region enables the flexible support layer to be folded, the bending region has a pattern region for reducing a modulus of the flexible support layer and a fixed region for fixation with the rotating shaft, and the fixed region is provided with a support post to ensure that the flexible display device will not bulge during unfolding. However, during use of flexible display device, breakage will easily occur at connection between the support post and the fixed region, which affects the use of flexible support layer.

SUMMARY

The following is a summary of subject matter described herein in detail. The summary is not intended to limit the protection scope of claims.

In a first aspect, an embodiment of the present disclosure provides a flexible support layer including at least two non-bending regions and at least one bending region connecting two adjacent non-bending regions, wherein the at least one bending region includes a fixed region and a pattern region located between the fixed region and one of the non-bending regions, and support strips are provided at one side of the pattern region.

In an exemplary implementation, the support strips are arranged along a direction parallel to the fixed region, and multiple support strips are arranged at even intervals along a direction perpendicular to the fixed region.

In an exemplary implementation, the support strips are made of a metal material.

In an exemplary implementation, a cross-sectional shape of a support strip includes a circular, elliptical, triangular, rectangular, or trapezoidal shape.

In an exemplary implementation, a support post is provided at one side of the fixed region, and the support post and the support strips are located at a same side of the bending region.

In an exemplary implementation, a protective layer is provided on at least one side of a joint between the support post and the fixed region.

In an exemplary implementation, a side surface of the protective layer away from the joint between the support post and the fixed region is planar, arc-shaped or serrated.

In an exemplary implementation, the protective layer is made of a colloidal material or a rubber material.

In an exemplary implementation, a buffer layer is disposed at one side of the pattern region close to the support post.

In an exemplary implementation, the buffer layer is made of a foam material.

In an exemplary implementation, the pattern region includes multiple aperture patterns arranged at intervals, wherein the aperture patterns are arranged along a direction parallel to the fixed region, and multiple aperture patterns are arranged at even intervals along a direction perpendicular to the fixed region.

In a second aspect, an embodiment of the present disclosure further provides a flexible display device, including the flexible support layer described above and a flexible display panel disposed at one side of the flexible support layer away from the support strips.

In an exemplary implementation, a fixing glue layer is disposed between the flexible display panel and the flexible support layer.

Other aspects may be comprehended upon reading and understanding of drawings and detailed descriptions.

DETAILED DESCRIPTION

The embodiments of the present disclosure will be described in detail below with reference to the drawings. It is to be noted that implementation modes may be implemented in multiple different forms. Those of ordinary skills in the art may easily understand such a fact that implementations modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the specification, for convenience, wordings indicating orientation or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions according to which the constituent elements are described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the present disclosure, "about" refers to that a boundary is defined not so strictly and numerical values within process and measurement error ranges are allowed.

Figure 1:
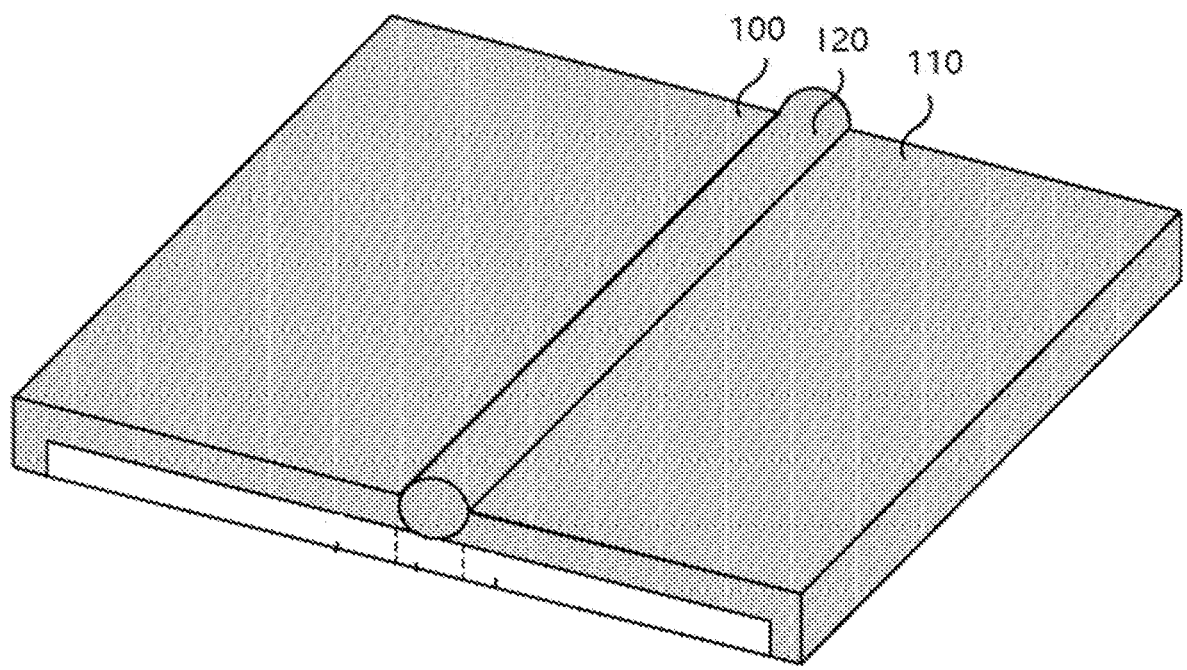
FIG. 1 is a schematic diagram of a structure of a flexible display device according to an embodiment of the present disclosure.

FIG. 1 is a schematic diagram of a structure of a flexible display device according to an embodiment of the present disclosure. As shown in FIG. 1, the flexible display device according to the embodiment of the present disclosure includes a first housing 100, a second housing 110 and a rotating shaft 120. The first housing 100 and the second housing 110 are located at two sides of the rotating shaft 120 and are rotationally connected through the rotating shaft 120. The first housing 100 and the second housing 110 can be rotated about the rotating shaft 120 respectively, such folding and unfolding of the flexible display device can be realized.

In an exemplary embodiment, structures of the first housing 100 and the second housing 110 may be the same to form a display device with a symmetrical structure, and the first housing 100 and the second housing 110 may also be made into different structures as required.

Figure 2:
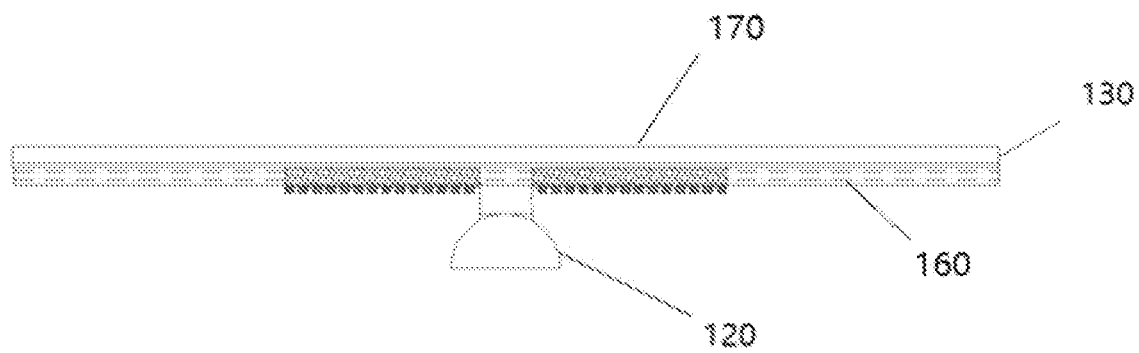
FIG. 2 is a first schematic diagram of a structure of a flexible display module in an unfolded state according to an embodiment of the present disclosure.
Figure 3:
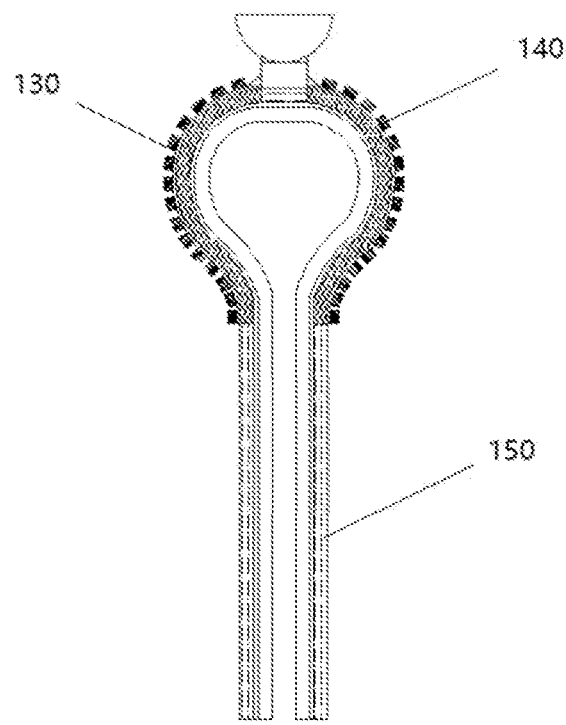
FIG. 3 is a schematic diagram of a structure of a flexible display module in an inward folded state according to an embodiment of the present disclosure.
Figure 4:
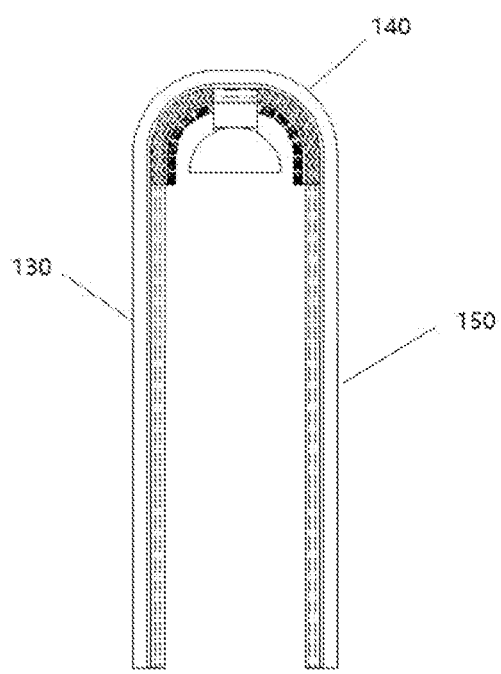
FIG. 4 is a schematic diagram of a structure of a flexible display module in an outward folded state according to an embodiment of the present disclosure.

FIG. 2 is a schematic diagram of a structure of a flexible display module in an unfolded state according to an embodiment of the present disclosure. FIG. 3 is a schematic diagram of a structure of a flexible display module in an inward folded state according to an embodiment of the present disclosure. FIG. 4 is a schematic diagram of a structure of a flexible display module in an outward folded state according to an embodiment of the present disclosure. In an exemplary embodiment, as shown in FIG. 2, FIG. 3 and FIG. 4, the flexible display device according to the embodiment of the present disclosure may further include a flexible display module 130 for displaying an image. For example, the flexible display module 130 includes a flexible display panel which may be an organic light emitting diode (OLED) display panel. The flexible OLED display panel includes a flexible substrate and an OLED device disposed on the flexible substrate, wherein a material of the flexible substrate is, for example, polyimide (PI). The OLED device can realize self-luminescence, and the display device with the OLED display panel does not need to be provided with a backlight source. When the material of the substrate of the OLED display panel is a flexible material, the above OLED display panel can be bent.

The flexible display module 130 includes a bending region 140 and a non-bending region 150 located at two sides of the bending region 140. The first housing 100 and the second housing 110 are respectively connected with the non-bending region 150 at the two sides of the bending region 140, and the rotating shaft 120 is connected with the bending region 140. When the flexible display module is folded from the unfolded state, the flexible display module can be bent along the bending region 140.

In an exemplary embodiment, as shown in FIG. 3 and FIG. 4, bent states of the foldable display device include an inward folded state and an outward folded state. Herein, the outward folded state refers to that a display side of the flexible display module 130 is at the outer side after the flexible display module 130 is bent; on the contrary, the inward folded state refers to that the display side of the flexible display module 130 is at the inner side after the flexible display module 130 is bent, so as to effectively protect the flexible display module 130 from external impact when the flexible display module is in the bent state, reducing the risk of the failure of the flexible display module 130. When the flexible display module 130 is in a bent state, the bent region 140 is bent in a shape of a water drop. The flexible display module according to the present embodiment may realize 360-degree folding.

One side of the flexible display module 130 connected with the first housing 100 and connected with the second housing 110 is a non-display side of the flexible display module 130, and one side of the flexible display module 130 away from the first housing 100 and away from the second housing 110 is the display side of the flexible display module 130.

As shown in FIG. 2, the flexible display module 130 includes a flexible display panel 170 and a flexible support layer 160 located at the non-display side of the flexible display panel 170. The flexible support layer 160 is used for ensuring reliability and support of bending of the flexible display module 130.

Figure 5:
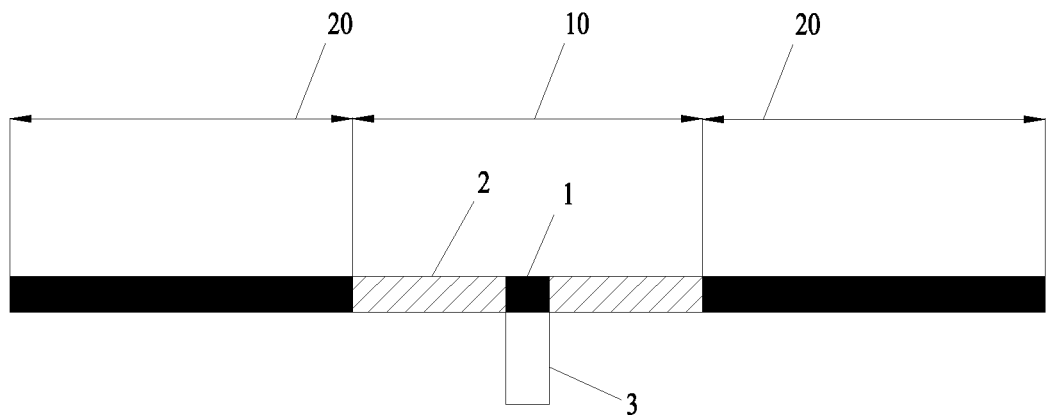
FIG. 5 is a schematic diagram of a structure of a flexible support layer according to an embodiment of the present disclosure.
Figure 6:
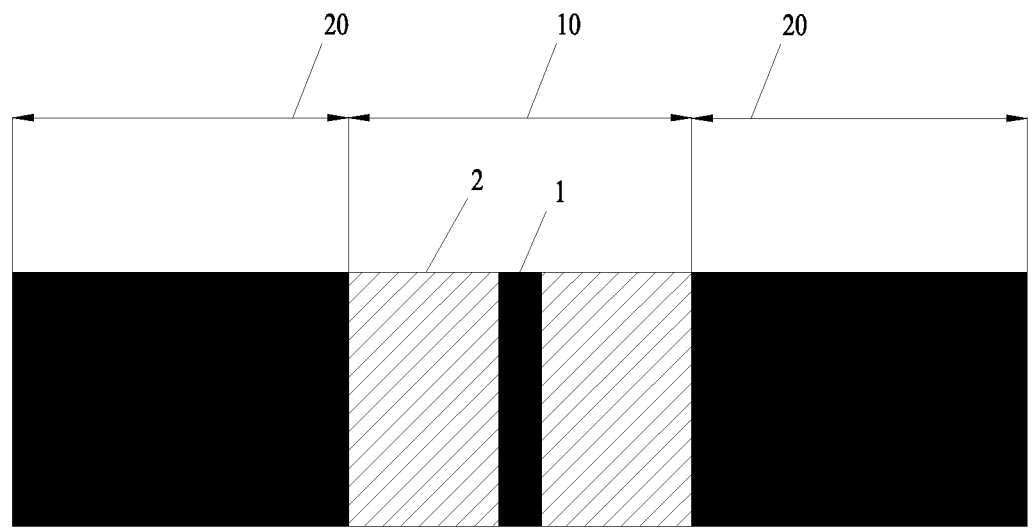
FIG. 6 is a top view of a flexible support layer according to an embodiment of the present disclosure.
Figure 7:
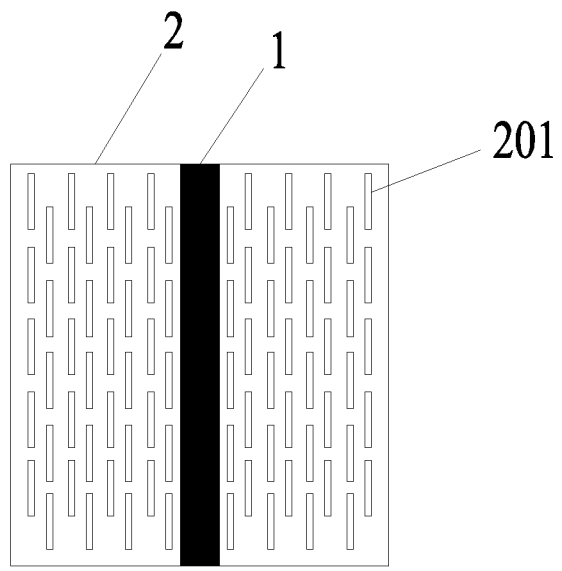
FIG. 7 is a top view of a bending region in a flexible support layer according to an embodiment of the present disclosure.

FIG. 5 is a schematic diagram of a structure of a flexible support layer according to an embodiment of the present disclosure. FIG. 6 is a top view of a flexible support layer according to an embodiment of the present disclosure. FIG. 7 is a top view of a bending region in a flexible support layer according to an embodiment of the present disclosure. As shown in FIG. 5, FIG. 6 and FIG. 7, an embodiment of the present disclosure provides a flexible support layer including at least two non-bending regions 20 and at least one bending region 10 connecting two adjacent non-bending regions 20, wherein each bending region 10 includes a fixed region 1 and a pattern region 2 located between the fixed region 1 and a non-bending region 20.

In an exemplary implementation, the fixed region 1 is a solid region on which no aperture pattern is provided. The fixed region 1 is configured to be fixedly connected with the rotating shaft.

In an exemplary implementation, the pattern region 2 includes multiple aperture patterns 201 arranged at intervals. Each aperture pattern 201 may be a groove structure or a strip-shaped perforation, the aperture patterns are 201 arranged along a direction parallel to the fixed region 1, and multiple aperture patterns 201 are arranged at even intervals along a direction perpendicular to the fixed region 1. The aperture patterns 201 are used for reducing a modulus of the pattern region 2 and facilitating the bending of the pattern region 2.

Figure 8:
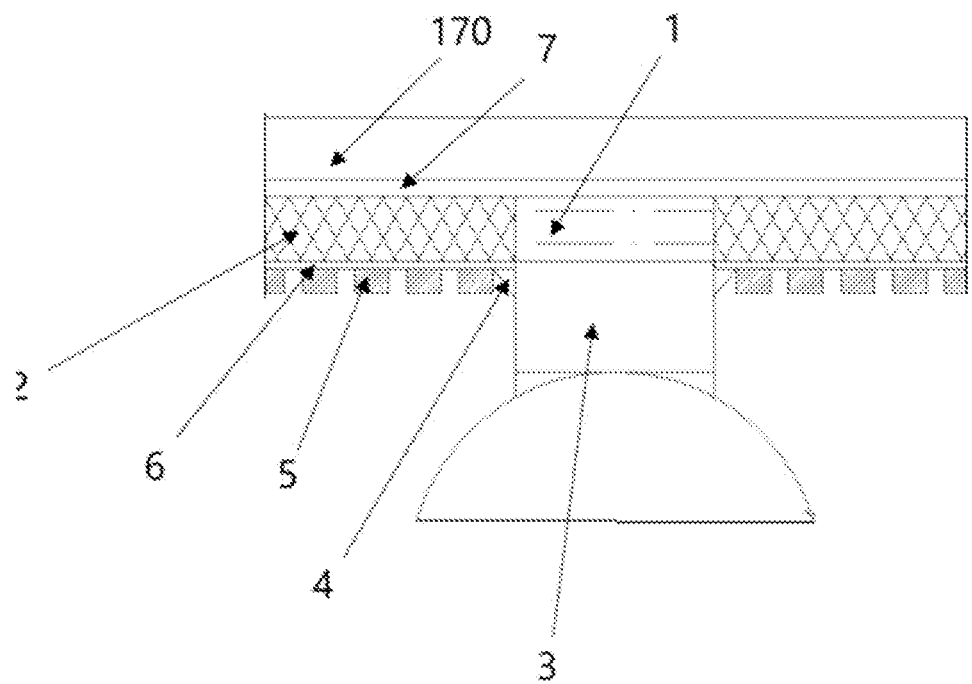
FIG. 8 is an enlarged view of a support post in a flexible support layer according to an embodiment of the present disclosure.

FIG. 8 is an enlarged view of a support post in a flexible support layer according to an embodiment of the present disclosure. As shown in FIG. 8, one side of the pattern region 2 in the flexible support layer of an embodiment of the present disclosure is provided with a support strip 5, wherein the support strip 5 is located at one side of the flexible support layer away from the flexible display panel. The support strip 5 supports the flexible support layer when the flexible support layer is folded and unfolded, thus ensuring the flatness of the flexible support layer.

In the exemplary embodiment, as shown in FIG. 8, the support strips 5 are arranged along a direction parallel to the fixed region 1 and multiple the support strips 5 are arranged at even intervals along a direction perpendicular to the fixed region 1. By way of example, the support strips 5 overspread the entire pattern region 2 along the direction perpendicular to the fixed region 1.

In an exemplary implementation, the support strip 5 is made of metal to ensure sufficient support force for the flexible display panel, for example, the support strip 5 is made of stainless steel.

In an exemplary implementation, a cross section of the support strip 5 may be in a variety of shapes. For example, the cross section of the support strip 5 may include one or a combination of circular, elliptical, triangular, polygonal shapes, wherein the polygonal shape may be a rectangle or a trapezoid.

In an exemplary implementation, as shown in FIG. 8, one side of the fixed region 1 is provided with a support post 3, wherein the support post 3 and the support strip 5 are located at the same side of the bending region 10, i.e. the support post 3 is located at the side of the flexible support layer away from the flexible display panel. The support post 3 is configured to be fixed with the rotating shaft. In an exemplary embodiment, the rotating shaft is correspondingly provided with a fixing hole, the support post 3 is inserted into the fixing hole and fixed with the rotating shaft 3, such that attachment between the flexible support layer and the rotating shaft 3 is better, the problem that the flexible display module bulges during conversion of folding form of the flexible display module is effectively solved, the flatness of the flexible display module during folding and unfolding is ensured, and safety of the flexible display module during bending is improved.

In an exemplary implementation, as shown in FIG. 8, at least on one side of a joint between the support post 3 and the fixed region 1 is provided with a protective layer 4. The protective layer 4 is configured to avoid local stress concentration at the joint between the supporting post 3 and the fixed region 1, to ensure the flatness of the device during unfolding, and to make the flexible supporting layer more stable in use.

When the flexible display module of the embodiment of the present disclosure is in the outward folded state, the side of the flexible support layer away from the flexible display panel is compressed, and the protective layer 4 at the joint between the support post 3 and the fixed region 1 is compressed, thereby protecting the inner side of the flexible display panel 170. When the flexible display module of the embodiment of the present disclosure is in the inward folded state, the side of the flexible support layer away from the flexible display panel 170 is stretched, the protective layer 4 at the joint between the support post 3 and the fixing region 1 is stretched to protect the outer side of the flexible display panel 170, and the protective layer 4 can protect the joint between the support post 3 and the fixed region 1 when the flexible display module is folded outward and inward, so as to avoid stress concentration and breakage at the joint between the support post 3 and the fixed region 1.

Figure 9:
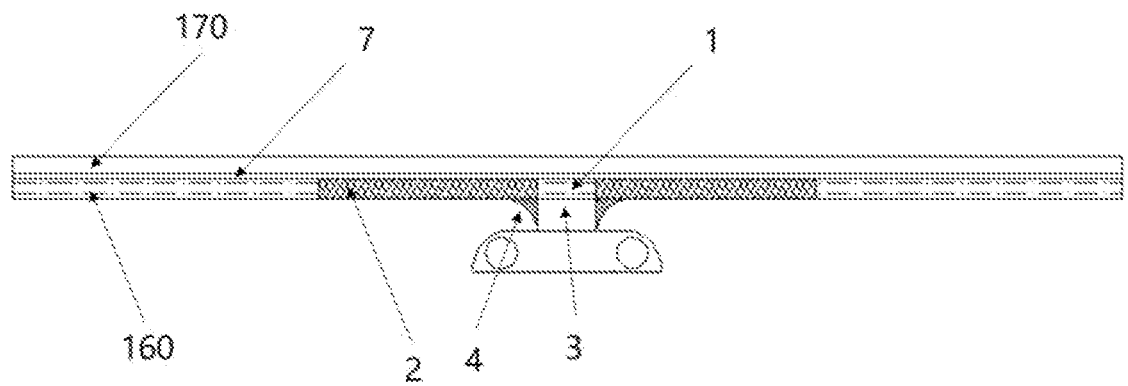
FIG. 9 is a second schematic diagram of a structure of a flexible display module in an unfolded state according to the embodiment of the present disclosure.
Figure 10:
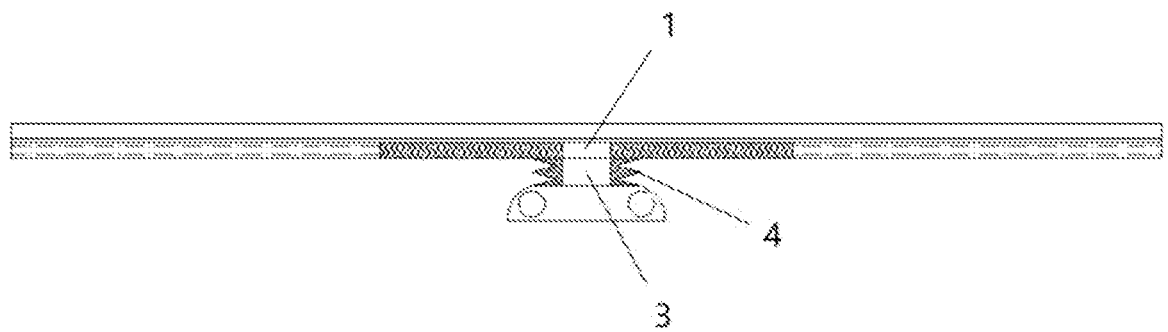
FIG. 10 is a third schematic diagram of a structure of a flexible display module in an unfolded state according to an embodiment of the present disclosure.

FIG. 9 is a second schematic diagram of a structure of a flexible display module in an unfolded state according to an embodiment of the present disclosure. FIG. 10 is a third schematic diagram of a structure of a flexible display module in an unfolded state according to an embodiment of the present disclosure. In the exemplary implementation, the protective layer 4 covers a corner at the joint between the support post 3 and the fixed region 1, and a surface at one side of the protective layer 4 away from the joint between the support post 3 and the fixed region 1 is planar, so as to ensure that a force on the flexible display panel is uniformly distributed when folded inward and outward, and the stress concentration at the connection is avoided, as shown in FIG. 8. Alternatively, a surface at one side of the protective layer 4 away from the joint between the support post 3 and the fixed region 1 is arc-shaped, so as to ensure that the force on the flexible display panel is uniformly distributed when folded inward and outward, and stress concentration at the joint is avoided, as shown in FIG. 9. Alternatively, the surface at the side of the protective layer 4 away from the joint between the support post 3 and the fixed region 1 is serrated. When the flexible display panel is folded outward, the serration of the serrated protective layer 4 can be attached more compactly to two sides of the supporting post 3, and the support at the joint between the support post 3 and the fixed region 1 is stronger while avoiding stress concentration. When the flexible display panel is folded inward, the protective layer 4 is unfolded more uniformly, such that the protective layer 4 does not generate extra force due to the applied tension, as shown in FIG. 10.

In an exemplary implementation, the protective layer 4 is made of a colloidal material or a rubber material. When the protective layer 4 is made of a colloidal material, the protective layer 4 can be formed at the joint between the support post 3 and the fixed region 1 through a dispensing process.

In an exemplary implementation, as shown in FIG. 8, one side of the pattern region 2 close to the support post 3 is provided with a buffer layer 6. The buffer layer 6 can uniformly disperse the stress in the pattern region 2 when the flexible display module is folded, so as to avoid local stress concentration in the pattern region 2, which causes breakage of the pattern region 2.

In an exemplary implementation, the buffer layer 6 is made of a foam material and the buffer layer 6 is adhered to the pattern region 2.

In an exemplary implementation, the support strip 5 is disposed at one side of the buffer layer 6 away from the pattern region 2 and can be adhered to the buffer layer 6.

An embodiment of the present disclosure further provides a flexible display device, including the flexible support layer described above and a flexible display panel disposed at one side of the flexible support layer away from the support strip. The flexible display device includes, for example, a mobile phone, a tablet computer, a smart wearable product (smart watch, bracelet), a personal digital assistant (PDA), a vehicle-mounted computer, or the like. A specific form of the above-mentioned flexible display device is not limited in the embodiments of the present disclosure.

In an exemplary implementation, as shown in FIG. 8, a fixing glue layer 7 is disposed between the flexible display panel 170 and the flexible support layer 160, wherein the fixing glue layer 7 is configured to adhere the flexible display panel 170 to the flexible support layer 160.

The drawings of the present disclosure only involve structures involved in the present disclosure, and other structures may refer to conventional designs. The embodiments in the present disclosure, i.e., features in the embodiments, may be combined with each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present disclosure.

The invention claimed is:

1. A flexible support layer, comprising at least two non-bending regions and at least one bending region connecting two adjacent non-bending regions, wherein the at least one bending region comprises a fixed region and a pattern region located between the fixed region and one of the non-bending regions, and support strips are provided at one side of the pattern region;

wherein a support post is provided at one side of the fixed region, and the support post and the support strips are located at a same side of the bending region;

wherein a protective layer is provided on at least one side of a joint between the support post and the fixed region; the protective layer covers a corner at a joint among the support post, the fixed region and the pattern region;

when the flexible support layer is in an outward folded state, a side of the flexible support layer away from a flexible display panel is compressed, and the protective layer at the joint between the support post and the fixed region is compressed; when the flexible support layer is in an inward folded state, the side of the flexible support layer away from the flexible display panel is stretched, the protective layer at the joint between the support post and the fixing region is stretched.

2. The flexible support layer according to claim 1, wherein the support strips are arranged along a direction parallel to the fixed region, and a plurality of support strips are arranged at even intervals along a direction perpendicular to the fixed region.

3. The flexible support layer according to claim 1, wherein the support strips are made of a metal material.

4. The flexible support layer according to claim 1, wherein a cross-sectional shape of a support strip comprises circular, elliptical, triangular, rectangular, or trapezoidal shape.

5. The flexible support layer according to claim 1, wherein a side surface of the protective layer away from the joint between the support post and the fixed region is planar, arc-shaped or serrated.

6. The flexible support layer according to claim 1, wherein the protective layer is made of a colloidal material or a rubber material.

7. The flexible support layer according to claim 1, wherein a buffer layer is provided at one side of the pattern region close to the support post.

8. The flexible support layer according to claim 7, wherein the buffer layer is made of a foam material.

9. The flexible support layer according to claim 1, wherein the pattern region comprises a plurality of aperture patterns arranged at intervals, the aperture patterns are arranged along a direction parallel to the fixed region, and a plurality of the aperture patterns are arranged at even intervals along a direction perpendicular to the fixed region.

10. A flexible display device, comprising the flexible support layer according to claim 1 and a flexible display panel disposed at one side of the flexible support layer away from the support strips.

11. The flexible display device according to claim 10, wherein a fixing glue layer is disposed between the flexible display panel and the flexible support layer.

* * * * *